United States Patent [19]
Elmore

[11] 3,856,680
[45] Dec. 24, 1974

[54] AUTOMATIC SCREEN CHANGER FOR EXTRUDING PROCESSES

[75] Inventor: Jeffrey T. Elmore, Webster, N.Y.

[73] Assignee: Mobil Oil Corporation, New York, N.Y.

[22] Filed: Oct. 15, 1973

[21] Appl. No.: 406,502

[52] U.S. Cl.................. 210/184, 210/236, 210/447
[51] Int. Cl............................................. B01d 35/18
[58] Field of Search ............ 210/184, 232, 236, 447

[56] References Cited
UNITED STATES PATENTS

| | | | |
|---|---|---|---|
| 3,443,693 | 5/1969 | Biermann | 210/236 X |
| 3,471,017 | 10/1969 | Kalman | 210/184 X |
| 3,471,023 | 10/1969 | Rosaen | 210/236 X |
| 3,615,257 | 10/1971 | Frost et al. | 210/447 X |
| 3,645,309 | 2/1972 | Kalman | 210/184 X |
| 3,645,401 | 2/1972 | Roberts | 210/232 |
| 3,743,101 | 7/1973 | Schmidt | 210/447 |

Primary Examiner—Charles N. Hart
Assistant Examiner—Richard W. Burks
Attorney, Agent, or Firm—Andrew L. Gaboriault; Carl D. Farnsworth

[57] ABSTRACT

An automatic screen changer for extrusion processes is described comprising a screen backing plate which supports the filter screen and moves transversely to the extruder bore when change of filter is required.

5 Claims, 3 Drawing Figures

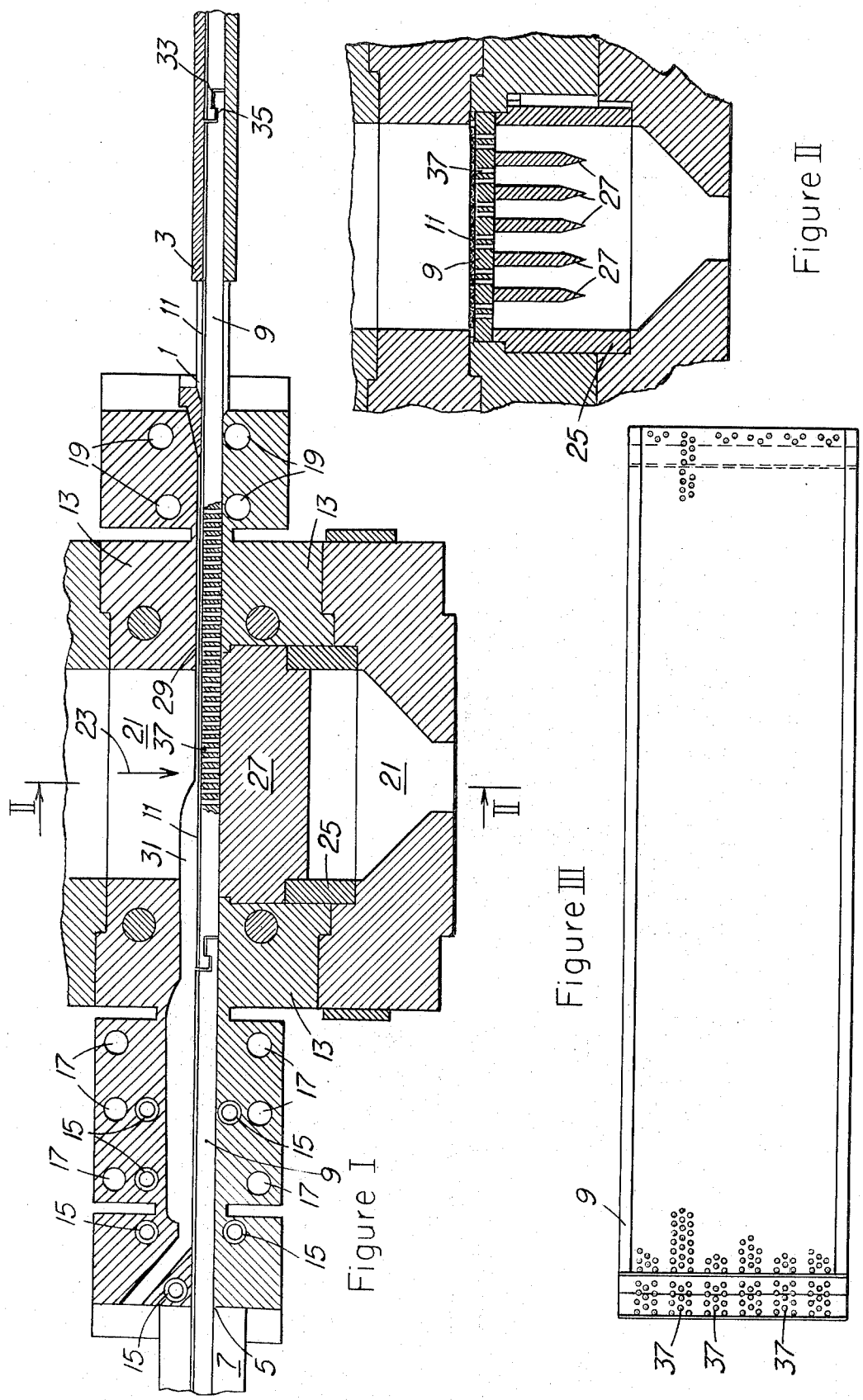

AUTOMATIC SCREEN CHANGER FOR EXTRUDING PROCESSES

BACKGROUND OF THE INVENTION

In a process for extruding thermoplastic material such as a process for extruding polyethylene, it has been found necessary to pass the melt or fluid polymer through a filtering screen such as a disc of stainless steel cloth of desired mesh in order to remove impurities such as dirt, cardboard and metal particles or other impurities which enter the process and can cause undesired characteristics in the extruded material. For example, in a polyethylene film extruding process such impurities can cause breakage in the blown film exiting from the extruder die. Screening of the fluid polymer creates a resistance to flow of the polymer thereby causing a back pressure in the extruder system which helps to obtain better melting and mixing of the polymer. However, in such high pressure systems, up to about 5,000 lbs pressure, the screen becomes clogged with inpurities and one of the largest downtime expenses in the extrusion process results from the time required to change the screen in the prior art systems and bring the interrupted process back on stream. In a polyethylene film extrusion process, the downtime includes the time to interrupt the process for removing and replacing the screen and the time required to restring the downstream sequence of steps for processing the film sheet. Furthermore, interruption of the process necessarily results in the production of considerable scrap material including film thereby reducing the overall economy and efficiency of the operation.

In view of the above operating difficulties, it is most desirable to reduce, if not completely eliminate, these operating functions contributing to the process downtime. Thus the problems associated with effecting changing of the screen without interrupting the extrusion process is an obvious area requiring improvement.

In a typical screen changer system is use today, two separate breaker plates and screen discs are located in a slide plate. When it is necessary to change screens, the slide plate is moved across the flow of polymer usually by hydraulic ram pressure thereby interrupting the polymer flow before a fresh screen is brought into the flow of polymer. This operation moves a dirty slide plate with screen to the outside of the extruder bore where it can be removed and cleaned. In such a system, the major objection resides in interrupting the flow of polymer which causes a downstream interruption in the film-making process and thus, the objectionable downtime above discussed.

In the prior art of U.S. Pat. No. 3,471,017, there is described a screen changing operation wherein the changer works by using the process hydrostatic pressure to move the screen across a backing plate. In this operation, a plug of polyethylene is first formed on the screen on one side of the extruder in a cooling section outward of the main body of the changer. This plug is attached to the screen by virtue of the polyethylene penetration and solidification in the screen. The pressure of the main polymer stream flow presses against the solid feed plug thereby causing it to move outward with the screen. However, a restriction in the wall through which the screen passes prevents the plug from being forced uncontrolled outwardly by the pressure. Thus, when it is desired to move the screen across the polymer flow an incremental distance, a heater provided outward of the cooling section is turned on to melt the outward portion of the formed plug above described. This softens the plug enough to permit the system pressure to move the plug and therefore the screen across the flowing stream of polymer.

A significant problem of this screen changing system resides in the screen packing in the holes in the fixed backing plate and this is aggravated as the pressure increases due to the accumulation of contaminants or impurities.

In U.S. Pat. No. 3,645,399, the above problems were apparently recognized since various arrangements are presented primarily associated with a cylindrical breaker or backing plate over which the screen moves during rotation of the cylinder. the arrangement of this patent system is very cumbersome of clean, expensive to fabricate and generally is not satisfactory in the extrusion system contemplated by this invention.

SUMMARY OF THE INVENTION

The present invention relates to a filtering means comprising a backing plate-screen strip assembly means used in an extruder system for viscous materials to remove undesired solid impurities. The breaker plate is a flat rectangular plate of restricted length to provide segments thereof which are perforated throughout the substantial length thereof. The breaker plate segments are designed to accommodate fitted filter screen segments which move concurrently with the breaker plate across a backing plate in the extruder bore which is slotted in the direction of the breaker plate-screen movement across the extruder bore. The breaker plate with screen move in response to pressure acting upon a formed plug of solidified polymer controlled in a manner similar to that described in U.S. Pat. No. 3,471,017. On the other hand, mechanical means and/or hydraulically actuated means may be used to move the breaker plate screen assembly and control the speed of movement thereof. The system and apparatus of the present invention permit replacing the filter screen plugged with impurities without interrupting the flow of polymer and without encountering problems identified with known prior art systems.

The present invention is directed to an improvement on the filtering means and enclosure of the prior art through which filter screens are moved transverse to the flow of fluid material and upon the relationship of filter screen segments matched to supporting perforated breaker plate means which permit changing the filter screen without interrupting the extrusion of temperature modified viscous material in fluid flow condition.

BRIEF DESCRIPTION OF THE DRAWINGS

FIG. I is a cross-sectional view of a filtering enclosure of a thermoplastic material extruder comprising thermally controlled inlet and exit seal opening, through which a filter screen and breaking plate transversely pass.

FIG. II is a cross-sectional view of the filtering enclosure shown in FIG. I rotated 90°

FIG. III is a top view of the breaker plate shown in FIGS. I and II used to support the filter screen.

DISCUSSION OF SPECIFIC EMBODIMENTS

Referring now to FIG. I, there is shown in cross-section, a filter screen enclosure assembly comprising inlet port 1 with plate guide means 3 and outlet port 5 with guide means 7 through which a perforated breaker plate support means 9 and its matching filter screen means 11 pass as herein described. In this arrangement the segmented breaker plate means 9 more fully described with respect to FIG. III in combination with its matching filter screen means 11 is passed through the filtering enclosure 13 by way of inlet seal opening or channel 1 and outlet seal opening or channel 5. The outlet seal channel 5 is provided with heater means 15 and also with cooling means 17 such as water cooling channels. Similarly the inlet seal opening or channel 1 is provided with cooling means 19 and may be provided with heating means, not shown, similar to that shown adjacent the outlet channel. The inlet port or channel 1 is essentially a rectangular port which is sized to accommodate the breaker plate-screen assembly means for relatively easy movement therethrough. The outlet port or channel 5 is sized, on the other hand, to permit an accumulation of polymer material to build up on the upstream side of the filter to form a plug of material used to move the plate-screen assembly means as herein described. In the arrangement of FIG. I, heat softened plastic material passes downwardly through the central bore 21 of the extruder assembly in the direction indicated by arrow 23 to the screen filter 11. The melt comprising a heat softened viscous material such as a thermoplastic material or resin is passed through the filter screen, through the perforated breaker plate and thence through a slotted backing plate means 25 fixed in the extruder bore before merging to form a composite or homogeneous filtered stream of heat softened plastic. In this specific arrangement the breaker plate comprises segments about 18 inches long, longer or shorter ones may be employed, and perforated as shown in FIG. III supports a size matched filter screen means of about 40 or more mesh size. This screen-breaker plate assembly is in turn supported by a backing plate means 25 rigidly or fixedly positioned in the extruder bore and formed of spaced apart substantially parallel thick webbed support bars 27 which traverse the circular bore opening 21 in the direction of screen movement. The filtered heat softened thermoplastic material passes through the slots between the support bars of the backing plate assembly means to form a homogeneous temperature controlled fluid stream before passing through a downstream extrusion die not shown.

In operation heat softened plastic material fills the void space 29 and 31 provided around the breaker-plate-screen assembly means in the inlet and outlet ports. As the plastic material is hardened in the void space by the cooling means, it seals the inlet and exit ports. When the screen becomes coated with impurities requiring its replacement with fresh screen the hardened plastic in the void spaces 29 and 31 is heated and surface softened sufficient to permit the transverse movement of the breaker-plate-screen assembly by process pressure mechanical and/or hydraulic pressure in the amount required to bring fresh screen surface in the extruder bore. Eventually the breaker-plate-screen assembly projects sufficiently from the outlet port to be separated from a separate following interlocked breaker-plate-screen filter segment. The thus separated breaker-plate-screen assembly may then be cleaned as by burning the accumulated resin and impurities thereon or separated therefrom by other available means. The filter enclosure is maintained at a desired elevated temperature essentially by the heated fluid being passed through the extruder bore. In the case of thermoplastic material it may be at a temperature in the range of 250°F. to about 600°F. depending upon the thermoplastic resin being extruded.

Movement of the breaker-plate-screen assembly means is accomplished in a specific embodiment by the differential pressure imposed upon the solidified plug of plastic filling void space 31 in the outlet port and the void space 29 provided in the inlet port. This technique for pressure moving the screen by a solidified plastic plug is known in the art and described in U.S. Pat. No. 3,471,017.

FIG. II is a cross-sectional view of the filtering enclosure shown in FIG. I but turned 90° to more clearly show the backing plate support bars 27 which traverse the extruder bore 21. Also an end view of the breaker plate 9 with its fitted filter-screen 11 is shown. In this view it will be observed that the perforations in the breaker plate coincide with the space between the backing plate support bars. Also shown is a recess in the breaker plate for holding a size matched filter screen sheet to the breaker-plate.

FIG. III is a top view of the breaker plate 9 shown and described with respect to FIGS. I and II. In this arrangement of FIG. III, the breaker-plate 9 is about 18 inches long and approximately 5 inches wide. a raised flange of about 0.035 inch thickness and approximately 0.245 inches wide runs the length of each side as shown in FIG. II thus providing a depressed center section within which a strip or sheet of size matched filter screen is placed. The filter may be formed of any material which will stand the temperature and pressure of the system in which used. Stainless steel filter screen is often used to filter extruded thermoplastic material. The breaker-plate is provided with rows of closely spaced holes 37 throughout the length thereof which are grouped to form strips of holes as shown in matching alignment with the void space between the parallel support bars 27 of the backing plate assembly 25. In this specific embodiment holes approximately three abreast form the perforated strips which are used and spaced between support bars as shown. Each end of the breaker-plate is provided with a transverse tongue in the form of a lip 33 with adjacent groove 35 interlocking arrangement for attaching a breaker-plate screen assembly sequentially to another following one to form a continuous filtering means for passage through the inlet and outlet ports of the filtering enclosure. In FIG. I this interlocking lip 35 and groove 35 arrangement is shown arranged on opposite sides of each end of the breaker plate to provide for easy attachment and separation as required. More specifically the interconnecting arrangement may be referred to as a lap joint interlock which is sufficiently loose fitting to permit easy coupling and uncoupling during onstream use.

It will be readily apparent to those skilled in the art that the improved break-plate screen assembly arrangement of the present invention is particularly useful for maintaining a thermoplastic material extruder in continuous uninterrupted operation even during changing of the filter screen. Thus in a filtering and extrusion run using a low density thermoplastic material such as polyethylene material, the pressure of the extruder may be within the range of 2,500 to 6,000 psi and the temperature maintained within the range of 250°F. to 350°F. The inlet and outlet ports of the screen changing assembly will be at a sufficiently lower temperature to maintain the thermoplastic seal plugs except when desired to effect screen change at which time a partial melting of the seal plugs will be accomplished. Movement of the breaker-plate with attached screen by the attached thermoplastic plug may be controlled as a function of the temperature imparted to the plug and screen assembly.

Having thus provided a general discussion of the method and means of the present invention and described specific embodiments in support thereof, it is to be understood that no undue limitations are to be imposed by reason thereof except as defined in the following claims.

I claim:

1. In apparatus for extruding heat softened material wherein a filter screen enclosure having inlet and outlet parts is placed transverse the bore of an extruder housing the flow of heat softened material and periodic change of a filter screen in said filter screen enclosure of said extruder is required without interrupting the flow of heat softened material, the improvement which comprises:

a backing plate with spaced apart transverse support bars across the extruder bore in the filter screen enclosure of the extruder, an elongated perforated rectangular breaker plate in matching engagement with a strip of filter screen in said inlet and outlet parts of said filter screen enclosure which will move with said screen across said backing plate and said extruder bore, said breaker-plate-screen filter combination passing through said inlet and outlet parts in said filter enclosure provided with adjacent temperature adjusting means and said outlet port sized larger than said inlet port to permit the accumulation of a plug of solidified thermoplastic on the upstream side of the screen which is used under the influence of pressure to transversely move said breaker-plate-screen assembly when solidified thermoplastic material is softened in the inlet and outlet ports of said screen enclosure.

2. The apparatus of claim 1 in which said breaker plate is provided with rows of holes therethrough which rows of holes are aligned with the space between the transverse support bars of the backing plate.

3. The apparatus of claim 1 in which the breaker plate is provided with a transverse groove adjacent the end thereof which will accept the transverse lip on the end of a second breaker plate brought in matching contact therewith.

4. The apparatus of claim 1 in which the breaker plate is provided with a recessed portion throughout the length and width thereof within which recessed portion a filter screen is retained.

5. The apparatus of claim 1 in which the filter screen is moved with its matching adjacent breaker plate across the extruder bore by a controlled force and temperature adjusted conditions when the screen collects impurities in an amount raising the extruding pressure in excess of 5,000 psi.

* * * * *